United States Patent [19]

Pitesky

[11] 4,247,399

[45] Jan. 27, 1981

[54] FILTERING AND PARTICULATE WASHING DEVICE

[76] Inventor: Isadore Pitesky, 4001 Linden Ave., Long Beach, Calif. 90807

[21] Appl. No.: 19,449

[22] Filed: Mar. 12, 1979

[51] Int. Cl.³ .......................................... B01D 23/26
[52] U.S. Cl. .................................... 210/341; 210/406; 210/436
[58] Field of Search ................... 210/323 R, 341, 406, 210/416 R, 429, 436, 446, 451; 422/101

[56] References Cited

U.S. PATENT DOCUMENTS

| | | | |
|---|---|---|---|
| 3,319,792 | 5/1967 | Leder et al. | 422/101 |
| 3,469,369 | 9/1969 | Helmke | 210/406 |
| 3,963,615 | 6/1976 | Plakas | 210/406 |

*Primary Examiner*—Ivars C. Cintins
*Attorney, Agent, or Firm*—William C. Babcock

[57] ABSTRACT

A device which in combination with a vacuum creating source and a pressurized source of a first liquid, permits all or a portion of a number of second liquids to be selectively filtered either singly or concurrently, and the particulates resulting from the filtering operation washed separately with the first liquid prior to the particulates being removed from the device. The device is of such structure that a number thereof may be connected by tubular means end-to-end to permit the separate filtering of any desired number of second liquids and the subsequent washing of the particulates from the second liquids with a first liquid from a pressurized source thereof.

11 Claims, 10 Drawing Figures

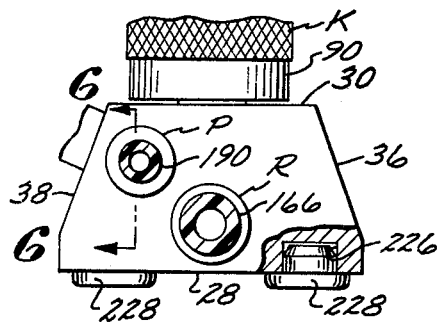
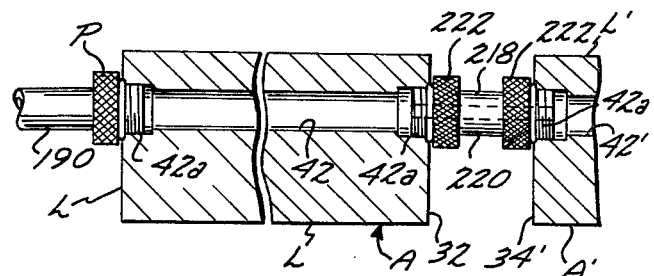
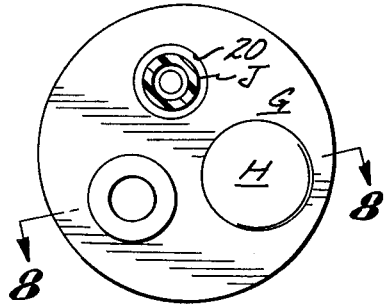
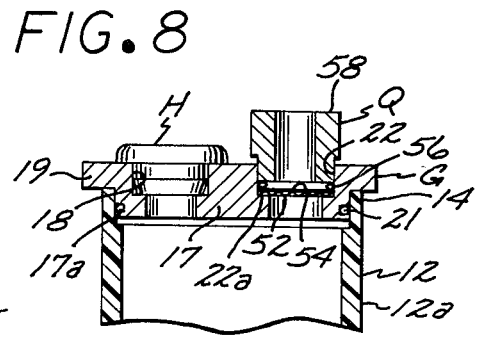
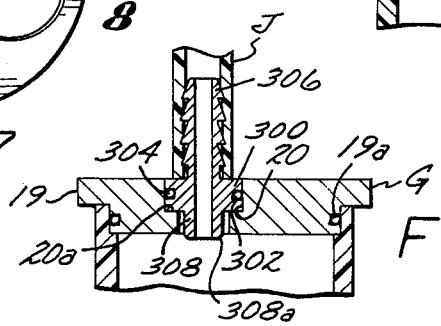
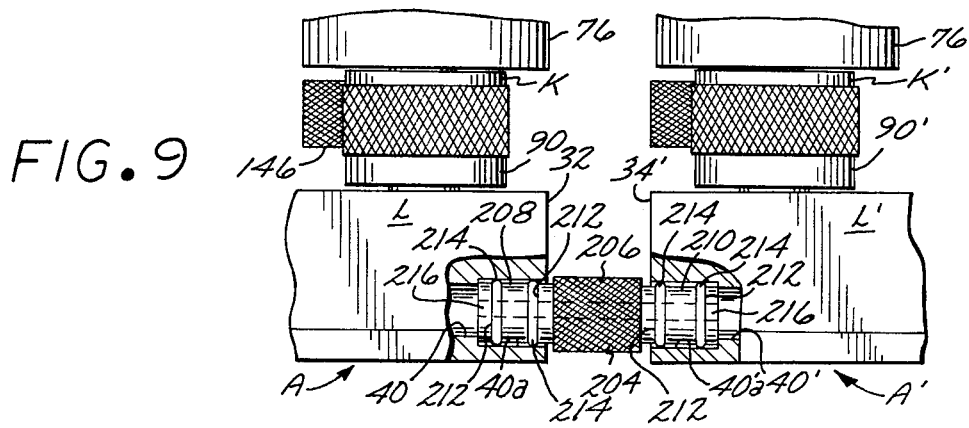

FILTERING AND PARTICULATE WASHING DEVICE

BACKGROUND OF THE INVENTION

1. Field of the Invention

Filtering and particulate washing device.

2. Background of the Invention

The rapid and efficient filtering of a number of different liquids and the washing of the particulates resulting therefrom has in the past required excessive time in laboratories.

A major object of the present invention is to provide a device to selectively carry out the filtering of a number of liquids, either concurrently or individually, and to wash the particulates resulting therefrom with a desired liquid prior to the particulates being removed from the invention.

Another object of the invention is to supply a multiple filtering and particulate washing device that has a simple mechanical structure, is simple and easy to use, requires a minimum of maintenance attention, and one that will substantially reduce laboratory time required in filtering and particulate washing operations.

SUMMARY OF THE INVENTION

The present invention is used in conjunction with a vacuum creating source and a source of a pressurized first liquid to selectively filter one or more desired second liquids either concurrently or in sequence, and to wash the particulates resulting therefrom with the first liquid prior to the particulates being removed from the invention.

Each of the devices includes a number of assemblies for holding individually a number of second liquids prior to the latter being subjected to a filtering operation. Each of the assemblies includes an elongate vertically positionable cylinder having an upper end and a lower end. Each cylinder is provided with a cover that engages the upper end, with the cover having first, second and third spaced openings therein. The first openings serve to introduce one of the second liquids into the cylinder prior to the filtering operation. A stopper is provided that removably engages the first opening.

A number of lengths of pliable tubing are provided, each of which lengths is in communication with one of the second openings. A number of rotatable first valve means are provided, each of which is removably secured to the lower end of one of the cylinders. Each of the valve means has a longitudinal passage therein, and each first valve means further including a lower end portion on which external threads are defined. Each first valve means includes a resilient seal supported thereon and situated below the external threads previously mentioned. Each of the first valve means includes a filter so disposed therein that second liquid in the cylinder must pass through the filter prior to flowing from the first valve means.

Each of the devices includes an elongate rigid manifold block that has a flat lower surface, a top, first and second end walls and a pair of first and second side walls, and first and second passages that extend longitudinally through the manifold block to terminate at the first and second end walls.

A number of longitudinally spaced first bores extend downwardly in the manifold box from the top thereof to the first passage. Each of the first bores includes a tapped portion and a circular body shoulder situated therebelow. Each of the previously mentioned tapped portions of the first bores is rotatably engaged by one of the threaded portions of one of the first valve means. The manifold block also has a number of longitudinally spaced second bores therein that extend inwardly from the first side wall to the second passage.

A number of second valve means are provided that are connected to the second bores, as well as to the pliable hose, with each of the second valve means capable of occupying either first or second positions in which communication is blocked or effected between the pliable hose and the second passage. A pair of plugs are provided for sealing the first and second passages at the first end wall of the manifold block. A first conduit is provided that connects the vacuum creating source to the first passage at the second end wall, and a second conduit serves to likewise connect the source of pressurized first liquid to the second passage at the second end wall. Each of the third openings in the cover has a vent assembly therein, which vent assembly includes a porous member that prevents air-borne material entering the cylinder with which the vent assembly is associated, but allows air to escape from the cylinder when the first liquid is being discharged therein to wash particulate on the filter associated with that cylinder.

The use and operation of the invention is as follows.

The second valve means are placed in the first position to obstruct communication between the second passage and the interior of the cylinders. Each second liquid to be filtered is introduced into a cylinder through the first opening in the cover thereof. During introduction of a second fluid into one of the cylinders, the first valve means is disposed in a second position in which communication between the interior of the cylinders and the first passage is blocked. A number of the second liquids may be concurrently filtered, by moving the first valve means of the cylinders in which they are diposed to second positions where communication is established between the interior of the cylinder and the first passage. The vacuum in the first passage causes second liquids in the cylinder to flow downwardly through the filters, with their particulate being deposited thereon. After all of the second liquids have been drawn into the first passage to flow to the vacuum creating means, the second valve means are placed in second positions for first liquids to flow under pressure from the second passage and the pliable hose into the cylinders to wash the particulates that have been deposited on the filters therein. The first liquid after the washing particulates is drawn downwardly through the filters into the first passage to be discharged therefrom. The filters bearing the particulates are now separated from the portion of the first valve means that held the filters, and also held the cylinders in fixed relationship therewith.

BRIEF DESCRIPTION OF THE DRAWING

FIG. 5 is an end view of the device;

FIG. 6 is a longitudinal cross sectional view of a first manifold block illustrating the manner in which the second passage therein may be removably connected to a second passage of the manifold block;

FIG. 7 is a top plan view of one of the covers that is removably mounted on one of the cylinders;

FIG. 8 is a fragmentary longitudinal cross-sectional view of the upper portion of one of the second liquid holding container assemblies;

FIG. 9 is a fragmentary side elevational view of two of the filtering devices disposed end-to-end and the first passages therein removably connected by a conduit assembly; and FIG. 10 is a fragmentary longitudinal cross sectional view of the upper portion of one of the second liquid holding container assemblies and illustrating a quick release connector that establishes communication between one of the resilient tubes and the interior of the container assembly.

DESCRIPTION OF THE PREFERRED EMBODIMENT

Figure 1:
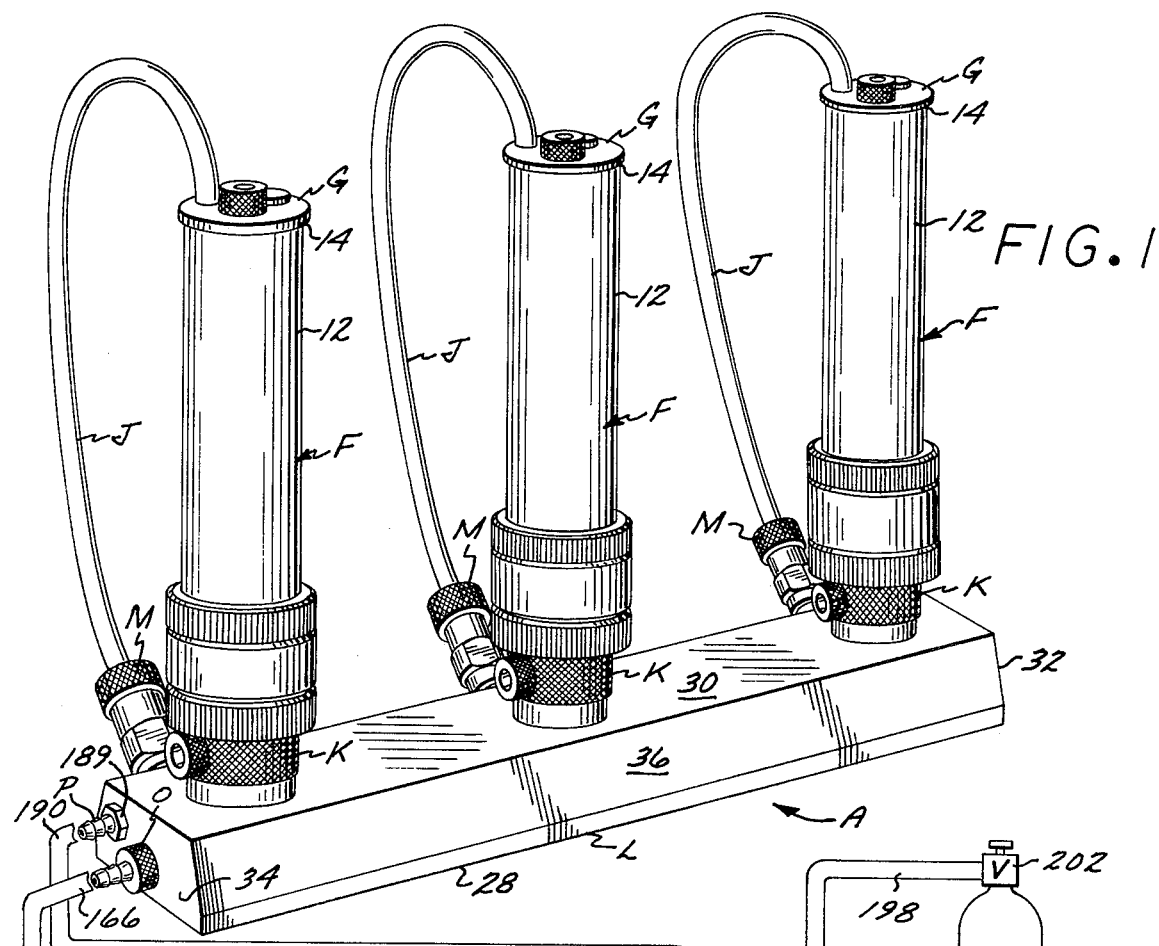
FIG. 1 is a perspective view of the device and the vacuum creating source and source of pressurized first liquid being illustrated diagrammatically.

The filtering and particulate washing invention A is illustrated in FIG. 1 in association with a vacuum creating source B and source C of pressurized first liquid D. The device A is used to separate particulates 10 from a number of separate second liquids E, and wash the particulates so separated with the first liquid D prior to the particulates being removed. The vacuum creating source B and source C of pressurized first liquid D are shown diagrammatically in FIG. 1.

The invention A includes a number of assemblies F that are shown in FIGS. 1 to 4 inclusive. Each assembly F includes an elongate, rigid, transparent, vertically disposed cylinder 12 that has an upper end 14 and lower end 16. Each cylinder 12 has an upper section 12a and a lower section 12b of lesser diameter. The sections 12a and 12b at their junction define a circumferentially extending groove 13 in which a resilient sealing ring 15 is disposed.

Each cylinder 12 is provided with a cover G as shown in FIGS. 1 and 8. In FIG. 8 it will be seen that each cover G includes a cylindrical body 17 from which a circular flange 19 projects outwardly from the upper portion thereof. Body 17 has a circumferential groove 17a therein in which a resilient sealing ring 21 is disposed. The sealing ring 21 is in pressure sealing contact with a recessed interior circular side wall portion of the upper cylinder section 12a when body 17 of cover G is pressed downwardly therein as shown in FIG. 8. Each cover G has first, second and third spaced openings 18, 20 and 22 extending downwardly therethrough. The first opening 18 in each cover G has a stopper H removably and sealingly mounted therein. Each second opening 20 is, by a quick release fitting 2, connected to a length of pliable tubing J as shown in FIG. 1.

Figure 3:
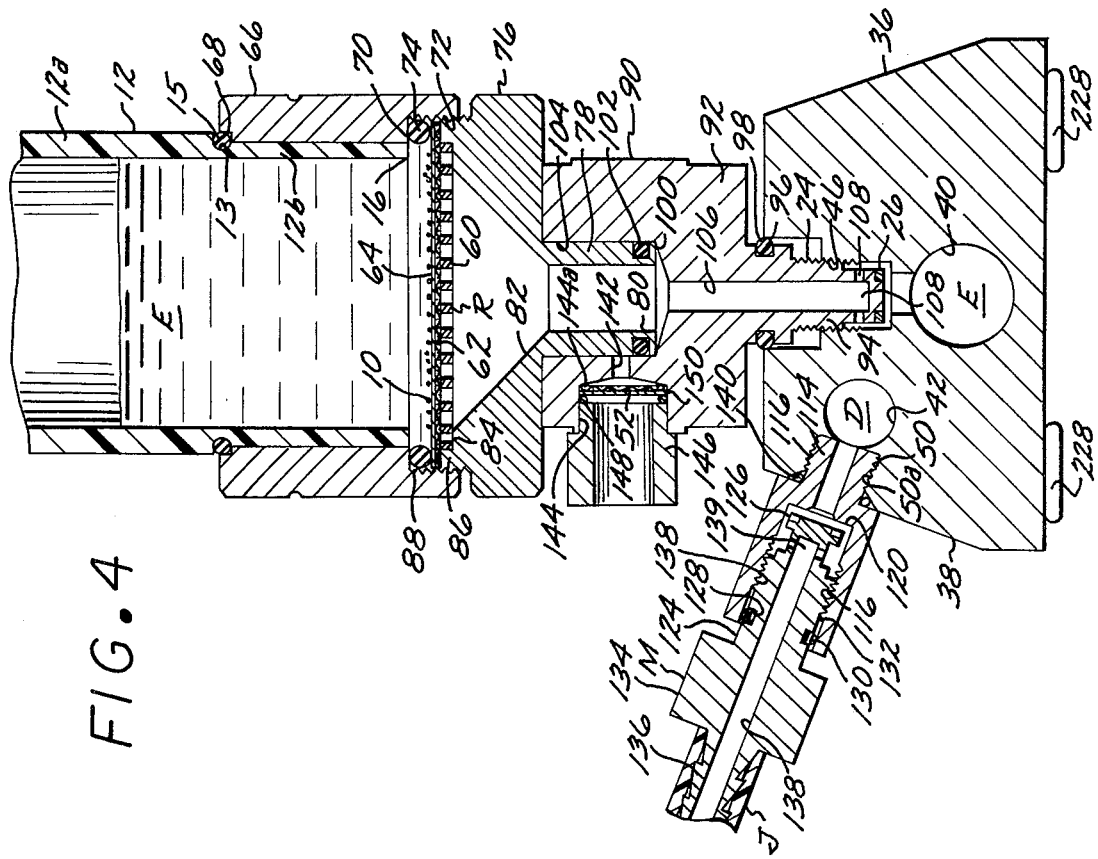
FIG. 3 is a fragmentary vertical cross-sectional view of the device with both the first and second valve means illustrated in the closed position.
Figure 4:
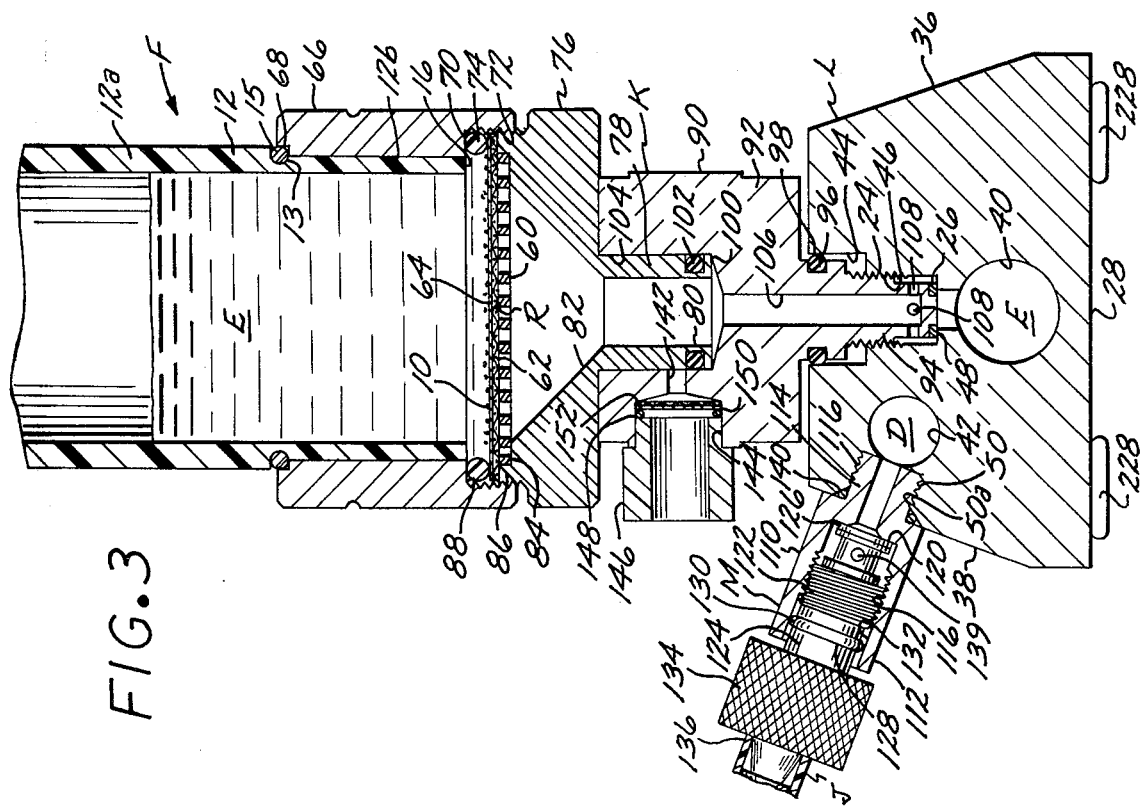
FIG. 4 is the same view as shown in FIG. 3 but with both the first and second valve means illustrated in open positions.

Each cylinder 12 has the lower section 12a removably engaged by a first valve assembly K shown in detail in FIGS. 3 and 4. Each valve assembly K includes a threaded section 24 and a resilient seal 26 situated therebelow. The valve assemblies K serve to hold the cylinder assemblies F in vertical positions above a manifold block L shown in FIGS. 1, 3 and 4.

The manifold block L is formed from a rigid material and has a flat lower surface 28, top 30, first and second end walls 32, 34, and first and second side walls 36 and 38. Manifold block L has first and second laterally spaced passages 40 and 42 that extend longitudinally between the first and second end walls 32 and 34. A number of longitudinally spaced first bores 44 of circular transverse cross-section extend downwardly in block L from the top 30 thereof and are in communication with first passage 40.

Each of the first bores 44 includes an internally threaded portion 46 and a circular body shoulder 48 therebelow. A number of longitudinally spaced second bores 50 are formed in manifold block L and extend inwardly from second side wall 38 to communicate with second passage 42. Each of the second bores 50 has a second valve assembly M mounted therein and extending outwardly from manifold block L as shown in FIGS. 3 and 4. The entrance to first and second passages 40 and 42 at first end wall 32 are removably sealed by plugs N. First passage 40 at the second end wall 34 has a tubular fitting O sealingly mounted therein and the second passage 42 likewise has a tubular fitting P in engagement therewith.

Each cover G as may be seen in FIG. 8 has an air vent assembly Q mounted in the third opening 22 thereof. Each third opening 22 has a circular body shoulder 22a defined therein. A screen 52 rests on body shoulder 22a and spans the third opening 22. A porous sheet 54 is supported on screen 52. The outer peripheral portion of screen 52 has a resilient sealing ring 56 resting thereon, and the sealing ring being held in place by a tubular member 58 that frictionally engages the third opening 22.

The first valve assemblies K not only serve to support the cylinders 12 in upwardly extending positions relative to manifold block L, but also provide supports for filter assemblies R as may be seen in FIGS. 3 and 4. Each of the filter assemblies R includes a circular, rigid, apertured plate 60, preferably formed from stainless steel, a screen 62 of larger diameter that rests on plate 60, and a circular filter media 64 of the same diameter as the screen and is supported on the upper surface thereof as shown in FIGS. 3 and 4.

Each first valve assembly K includes a rigid vertically disposed tubular shell 66 that slidably and snugly receives the lower cylinder section 12b within the interior thereof. Shell 66 has an upper interior grooved portion 68 that is removably and sealingly engaged by resilient ring 15. Shell 66 defines a circular interior body shoulder 70 from which a threaded interior circular surface 72 of the shell extends downwardly as shown in FIGS. 3 and 4.

Body shoulder 70 has a resilient sealing ring 74 in abutting contact therewith. Sealing ring 74 is also in abutting contact with the outer peripheral edge portion of filter media 64. A rigid circular body 76 is provided that has a tubular neck 78 depending therefrom, with the bore 80 in neck 78 developing into a tapered surface 82 in the body 76. The tapered surface 82 on the upper edge develops into a flat ring-shaped surface 84 on which the apertured plate 60 rests. Ring-shaped surface 84 is surrouned by a circular rib 86 that forms a part of body 76, with the rib having a flat upper surface on which the outer peripheral portion of screen 62 rests. The rib 86 and a portion of body 76 therebelow have threads 88 formed on the interior surface thereof that engage threads 72 of shell 66. When shell 66 is rotated in an appropriate direction relative to body 76 it moves downwardly relative to the latter due to engagement of threads 72 and 80, and resilient ring 74 effects a pressure seal between body shoulder 70 and filter media 64.

Valve assembly K also includes a valve member 90 that includes an upper portion 92 from which an elongate lower portion 94 of smaller diameter depends, with lower portion having a threaded section 24 defined thereon. The lower extremity of lower portion 94 supports resilient seal 26 as shown in FIGS. 3 and 4. Lower portion 94 adjacent the upper portion 92 of valve member 90 has a circumferential groove 96 therein in which a resilient seal ring 98 is disposed that is at all times in pressure sealing contact with the upper poart of bore 44.

The neck 78 as may be seen in FIGS. 3 and 4 has a circumferentially extending groove 100 on the external surface thereof in which a resilient sealing ring 102 is disposed. The neck 78 and sealing ring may be slid downwardly in a cavity 104 defined in valve member 90. Cavity 104 is in communication with a bore 106 that extends downwardly in lower portion 94 to terminate in a number of transverse bores 108.

When valve body 90, shell 66, and cylinder 12 associated therewith are concurrently rotated in an appropriate direction relative to manifold block L, the threads 24 and 46 rotate relative to one another and move seal 26 into pressure sealing contact with body shoulder 48. When such a seal is effected, second liquid E in cylinder 12 cannot be drawn downwardly through filter assembly R, even though a vacuum exists in first passage 40. Valve assembly K is shown in a sealing position in FIG. 3. In FIG. 4 the valveassembly K is shown in a position where a vacuum in first passage 40 will cause second liquid E in cylinder 12 to be drawn downwardly through filter assembly R, bore 106 and transverse bores 108 into first passage 40, with particulates 10 in the second liquid being retained on filter media 64.

The flow of first liquid D to wash the particulates is controlled by the second valve assemblies M. Each valve assembly M includes a valve body 110 that includes a cylindrical shell 112 having a tubular plug 114 extending longitudinally therefrom, which plug has external threads 116 thereon that engage threads 50a defined in one of the second bores 50. Shell 112 has intermediately disposed threads 118 on the interior surface thereof, and the shell and tubular plug 114 at their junction defining an interior ring-shaped body shoulder 120.

Threads 116 are in engagement with threads 122 on an elongate valve member 124, which valve member on the lower extremity supports a resilient seal 126 that may be brought into pressure sealing contact with body shoulder 120 as shown in FIG. 3. The portion of valve member 124 supporting seal 126 is of smaller transverse area than that of the interior portion of the shell 112 in which it is disposed. Valve member 124 has a circumferential groove 128 therein above threads 122, which groove has a resilient sealing ring 130 mounted therein that is at all times in sealing engagement with a smooth interior cylindrical surface 132 in valve body shell 112.

Valve member 124 includes an externally knurled cylindrical handle 134 outwardly disposed from the shell 112 as best seen in FIG. 3. An externally barbed tubular nipple 136 extends outwardly from handle 134 and is longitudinally aligned with the latter. The nipple 136 has one of the pliable tubes J removably secured thereto. A longitudinal bore 138 is defined in valve member 124 that communicates with nipple 136, and the bore developing into a number of transverse bores 139 adjacent the seal 126.

When the handle 134 is rotated in an appropriate direction the valve member 124 moves from the first position shown in FIG. 4 to the second position illustrated in FIG. 3 where seal 126 is in pressure contact with body shoulder 120 that serves as a valve seat. When seal 126 is so disposed communication between second passage 40 and bore 138 in valve member 124 is obstructed. By rotating the valve member 124 in the opposite direction the valve member may be moved to the first position illustrated in FIG. 4. Pressurized liquid F may now flow from second passage 42, tubular plug 114, and around seal 126 and through transverse bores 139 as indicated by arrow in FIG. 4 into bore 138 and then through pliable tube J into cylinder 12 to wash the particulates 10 on filter media 64. The shell 112 of valve body 110 at the junction with tubular plug 114 has a resilient seal ring 140 mounted thereon that is in sealing contact with second side wall 38 as shown in FIGS. 3 and 4.

The use of the invention A in filtering a number of different second liquids E and recovering the particulates 10 therefrom after the latter have been washed with the first liquid D is as follows.

The valve bodies 90 are rotated to move the seals 26 from the first position shown in FIG. 4 to the secondposition illustrated in FIG. 3 where the seals are in pressure contact with body shoulders 48 that serve as valve seats. Valve members 124 are likewise rotated to move seals 126 from the first position shown in FIG. 4 to the second position illustrated in FIG. 3. Each of the second liquids is now introduced into one of the cylinders 12. The valve bodies 90 shown in FIGS. 3 and 4 are rotated to dispose the seals in the second position in FIG. 3. The vacuum in first passage 40 causes the second liquid E to be drawn downwardly through filter assemblies R into bores 106 to flow through transverse bores 108, and thereafter flow around seals 26 to discharge into first passage 40. The particulates 10 from the second liquids E are deposited on the filter media 64.

The valve members 124 are now rotated to move seals 126 from the second positions shown in FIG. 3 to the first positions illustrated in FIG. 4. Pressurized first liquid D now flows from second passage 42 through second valve assemblies M, tubes J into cylinders 12 to flow over particulates 10 on filter media 64 to wash the particulates. The first liquid D is drawn downwardly through the first valve assemblies K into first passage 40 due to the vacuum in the latter.

After the particulates 10 have been washed, the first and second valve assemblies K and M are moved to the second positions shown in FIG. 3. Each of the cylinders 12 with the associated shell 66 and body 76 may now be lifted upwardly to separate neck 78 from valve body 90. The shells 66 are now unscrewed from the bodies 76 and the filter media 64 with washed particulates 10 thereon obtained for subsequent laboratory procedures.

The separation of the cylinders 12 with the associated shells 66 and bodies 76 from valve members 90 as above described results in there being a temporary negative air pressure in the cylinders 12 prior to the necks 78 separating from the valve members 90. This negative pressure is prevented from forming in the invention A by each first cavity 104 having a transverse bore 142 extending therefrom to a cylindrical recess 144. A tubular member 146 is pressed into the recess 144 and abuts against a sealing ring 148 that is in contact with a porous transverse sheet 150. Sheet 150 presses against a screen 152 that is in contact with a portion of the bottom 144a of recess 144. Bore 142 is disposed above sealing ring 102 on neck 78 as may be seen in FIG. 4.

Due to the above-described structure when neck 78 is moved upwardly in first cavity 104 above bore 142, air from the ambient atmosphere may flow through tubular member 146, filter sheet 150 and screen 152 into the interior of body 76. Thus, there is no differential in pressure between the interior of cylinder 12 and the ambient atmosphere that would cause a rush of air onto the filter media 64 to disturb particulates 10 thereon or contaminate the same with air borne material. Air borne material is removed by the porous sheet 150, which may be filter paper, as air flows from the ambient atmosphere into the interior of each body 76.

Figure 2:
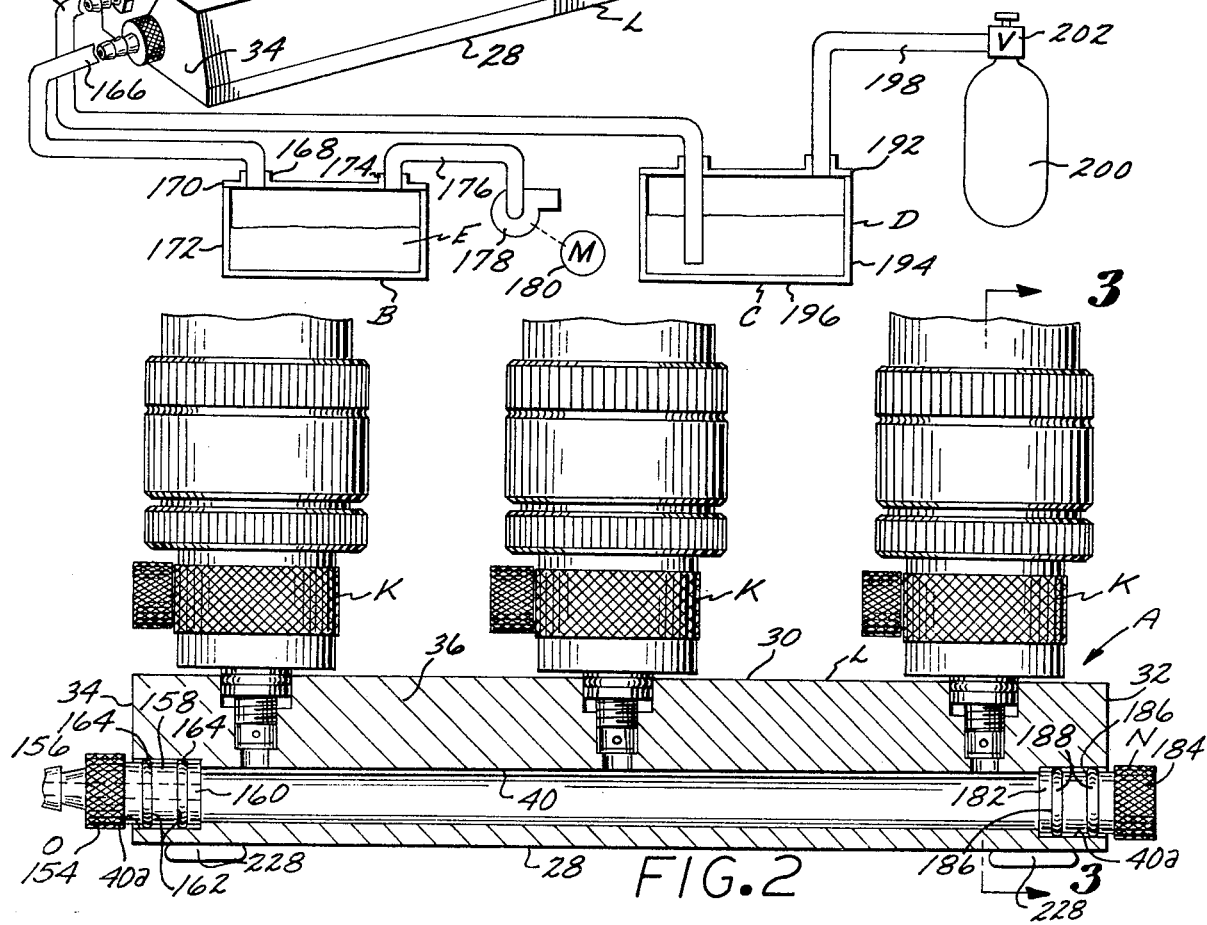
FIG. 2 is a combined side elevational and vertical cross sectional view of the device illustrated in FIG. 1.

The vacuum creating source B and source C of first pressurized liquid D are conventional and are shown diagrammatically in FIG. 1. The first passage 40 as shown in FIG. 2 has enlarged cylindrical end portions 40a. The fitting O that engages the end portion 40a adjacent second end wall 34 as shown in FIG. 2 includes a knurled cylindrical handle 154 that has an externally barbed tubular member 156 projecting from a first side and a cylindrical member 158 from the opposite side. A bore 160 extends longitudinally through tubular member 156, handle 154 and cylindrical member 158. Cylindrical member 158 has two longitudinally spaced circumferentially extending grooves 162 therein in which resilient sealing rings 164 are disposed. The barbed tubular member 156 is engaged by a pliable tube 166 that extends to a tubular connection 168 that extends through the top 170 of a cylindrical trap 172. A second tubular connection 174 extends through top 170, with the second connection being in communication with a tube 176 that extends to the suction side of a vacuum pump 178 that is driven by a prime mover 180, an electric motor, or the like.

When a single invention A is being used as shown in FIG. 1, the passage portion 40a adjacent the first end wall 32 is removably engaged by a sealing plug N. The plug N includes a rigid cylindrical body 182 that has a knurled cylindrical handle 184 on one end thereof. Body 182 has two longitudinally spaced, circumferentially extending grooves 186 therein in which resilient sealing rings 188 are supported. The plug N when pressed into passage portion 40a seals one end of first passage 40 from communication with the ambient atmosphere.

The second passage 42 as may be seen in FIG. 6 has tapped end portions 42a. The fitting P that engages the end portion 42a adjacent second end wall 34 is similar to fitting O and differs from the latter only in that the handle 189 has a number of flat wrench engageable faces defined thereon and the portion (not shown) that extends into the end portion 42a is externally threaded.

The fitting P is connected to a tube 190 that extends downwardly through a top 192 of a pressure vessel 194 to terminate adjacent the bottom 196 thereof. A tube 198 is connected to a cylinder 200 containing a pressurized inert gas such as nitrogen, which tube extends through the top 192 to communicate with the interior of the pressure vessel. The pressure vessel contains a quantity of the first liquid D. By opening a valve 202 on cylinder 200 pressurized gas flows to the interior of vessel 194 and first liquid D under pressure flows to second passage 42 for subsequent washing of the particulates 10 as previously described.

When it is desired to concurrently filter more second liquids E than may be handled by a single invention A as shown in FIG. 1, one of the inventions A and an identical invention A' may be disposed end-to-end as shown in FIG. 9. A connector 204 is now used to establish communication between the first passages 40 and 40' as shown in FIG. 9. The connector 204 includes a knurled handle 206 that has first and second cylindrical bodies 208 and 210 that extend outwardly from opposite ends thereof. The bodies 208 and 210 have two longitudinally spaced circumferentially extending grooves 212 thereon in which resilient sealing rings 214 are disposed. A bore 216 extends longitudinally through connector 204. The connector 204 removably and sealingly engages the adjacent end portions 40a and 40a' of the two aligned first passages 16 and 16'. Thus, when a vacuum is established in first passage 40 it will also be effected in first passage 40'. By the above-described means any number of longitudinally aligned manifold blocks L may have the first passages 40 therein removably and sealingly connected to one another.

The second passages 42 and 42' in manifold blocks L and L' are connected by a connector 218 shown in FIG. 6 which includes a tube 220 that has two longitudinally spaced, externally threaded tubular members 222 rotatably and sealingly mounted thereon that engage end portions 42a and 42a' of the second passages 42 and 42'. Thus when pressurized second liquid E is supplied to second passage 42 for particulate 10 washing purposes it is also supplied to second passage 42' in manifold block L'.

The manifold block L preferably has spaced recesses 26 extending upwardly from the bottom 28 thereof that frictionally receive resilient supporting pads 228.

The quick release fitting Z as may be seen in FIG. 10 includes a ring-shaped intermediate member 300 that has a circumferential groove 302 in the exterior surface thereof that is occupied by an outwardly projecting resilient O-ring 304. An externally barbed first tubular member 306 extends from a first side of member 300 and frictionally and sealingly engages an interior end portion of one of the resilient tubes J. A smooth surfaced second tubular member 308 projects from a second side of intermediate member 300 as shown in FIG. 10. Second opening 20 in cover G has an intermediately disposed inwardly extending lip 20a. Second tubular member 308 has a slightly tapered external end portion 308a. When second tubular member 308 is extended downwardly through opening 20 the intermediate member 300 is disposed therein to the extent that O-ring 304 is in pressure contact with the upper portion of second opening 20 and effects a fluid tight seal therewith, with the intermediate member 30 being in abutting contact with the lip 20a.

The use and operation of the invention has been described previously in detail and need not be repeated.

What is claimed is:

1. In combination with a vacuum creating source and a pressurized source of a first liquid, a device for selectively carrying out either a single filtering operation or multiple filtering operation on said second liquids to separate particulates therefrom and subject said particulates to washing with said first liquid prior to said particulates being removed from said device, said device including:

a. a plurality of assemblies for holding said second liquids prior to the latter being subjected to said filtering operation, each of said assemblies including an elongate vertically positionable cylinder having an upper end and a lower end; a cover that removably engages said upper end, said cover having first, second and third spaced openings therein, said first opening serving to introduce one of said second liquids into said cylinder; a stopper that removably engages said first opening; a length of pliable tubing in communucation with said second opening; rotatable first valve means that removably engage said lower end of said cylinder and that has a longitudinal passage therein, said first valve means including a lower end portion on which external threads are defined; a resilient seal supported on said lower end portion below said threads, and filter means so disposed in said valve means that liquid in said cylinder associated with said valve means must flow through said filter means prior to discharging from said valve means;

b. an elongate rigid manifold block that has a flat lower surface, a top, first and second end walls, and a pair of first and second side walls, first and second passages that extend longitudinally through said manifold block to terminate at said first and second end walls; a plurality of longitudinally spaced first bores that extend downwardly in said manifold block from said top to said first passage, each of said first bores including a tapped portion and a circular body shoulder situated therebelow, with each of said tapped portions being rotatably engaged by one of said threaded portions of one of said first valve means; and a plurality of longitudinally spaced second bores that extend inwardly from said first side wall to said second passage;

c. a plurality of second valve means connected to said second bores and to said pliable hose, each of said second valve means capable of occupying first and second positions in which communication is blocked and effected between said pliable hose and said second passage;

d. first and second plug means for removably sealing said first and second passages at said first end wall of said manifold block;

e. first and second tubular means that connect said vacuum creating source to said first passage and said pressurized source of said first liquid to said second passage at said second end wall of said manifold block;

f. a plurality of air vent assemblies removably disposed in said third openings in said covers, each of said air vent assemblies including a porous member that prevents air borne material entering said cylinder with which it is associated but allows air to escape from said cylinder when said first liquid is being discharged into said cylinder to wash said particulate on said filter means associated with said cylinder.

2. A device as defined in claim 1 in which each of said first valve means includes:

g. a valve body that has a first portion that has an upper and lower end, a first cylindrical cavity that extends downwardly into said body from said upper end, a second valve body portion that extends outwardly from said lower portion, said valve body portion having said threads defined on an intermediate portion thereof and said seal supported to a lower free end of said second portion, said seal in sealing engagement with said body shoulder when said valve body is in a first position, an elongate bore that extends downwardly from said first cavity through said second valve body portion to terminate in a plurality of transverse bores in said second portion;

h. a cylindrical support body that has a top and bottom, external threads on said support body adjacent said top, a ring-shaped surface disposed downwardly from said top that develops into a downwardly tapering concavity, a tubular neck that extends downwardly from said bottom and is in communication with said concavity, and said neck having a circumferentially extending groove in the external surface thereof adjacent the lower extremity thereof, and a first resilient ring disposed in said groove that seals with the surface portion of said support body that defines said cavity when said neck is slidably inserted thereinto, and said ring-shaped surface supporting said filter means;

i. a second resilient sealing ring that rests on the upper peripheral portion of said sealing means;

j. a cylindrical shell that has an upper and lower edge, an internal circular body shoulder in said shell adjacent said lower edge, and internal threads on the interior surface of said shell below said body shoulder, with said second resilient sealing ring being compressed into sealing contact with body shoulder of said shell and an upper peripheral edge portion of said filter means when said internal threads of said shell are screwed onto said external threads of said support body, with each of said cylinders having a lower portion that extends downwardly from an external outwardly projecting body shoulder defined on said cylinder, and the interior of said cylindrical shell being slidably and snugly engaged by said lower portion of one of said cylinders; and k. a third resilient sealing ring that abuts said body shoulder of said cylinder and an upper interior surface of said shell and effects a liquid tight seal therebetween.

3. A device as defined in claim 1 in which said sealing means includes:

l. a rigid circular apertured plate that rests on said ring-shaped surface in said cylindrical support;

m. a circular screen that rests on said apertured plate; and n. a circular membrane filter sheet that rests on said screen, said circular membrane filter sheet having the outer peripheral portion sealing engaged by said second resilient sealing ring.

4. A device as defined in claim 3 which in addition includes:

p. first filter supporting means on said valve body for equalizing the pressure in the interior of said cylinder with that of the ambient atmosphere without allowing foreign air borne material to contaminate said particulates on said filter membrane sheet and prevent a flow of air between the ambient atmosphere and the interior of said cylinder disturbing said particulates on said membrane sheet.

5. A device as defined in claim 1 which in addition includes:

g. first means operatively associated with each of said first valve means for equalizing the pressure in the interior with that of the ambient atmosphere prior to the cylinder and first valve means being lifted upwardly and separated from said manifold block.

6. A device as defined in claim 1 in which each of said second bores is tapped and each of said second valve means includes:

g. a valve body that includes a cylindrical shell that has first and second ends, threads defined on an interior surface of said shell intermediate said first and second ends, a first portion of the interior surface of said shell between said first end and threads having a smooth surface, a ring-shaped transverse body shoulder within the interior of said shell adjacent said second end, which body shoulder acts as a valve seat, and a tubular plug that has threads on the exterior surface thereof that engage said threads in one of said bores;

h. an elongate valve member that has first and second ends and a cylindrical handle intermediately disposed therebetween said handle dividing said valve member into first and second portions, said first portion ecured to one of said second tubular means, said second portion having threads thereon intermediately positioned between said handle and said second end of said valve member which threads engage said threads on the interior surface of said shell of said valve body, a transverse circumferentially extending groove in said second portion of said valve member, a resilient sealing ring mounted in said groove, said sealing ring sealingly engaging said first portion of the interior surface of said shell of said valve body, a transverse resilient seal mounted on said second end of said valve member of less transverse cross-section than that of the interior of said valve body shell in which it is disposed that sealingly engages said body shoulder when said valve member is in a first position, and a plurality of transverse bores in said second portion of said valve member intermediate said second end and said threads on said valve member, and said transverse bores in communication with said longitudinal bore therein, with said valve member when rotated to move to a second position where said resilient seal on said valve member is separated from said body shoulder establishing communication between said second passage and said second tubular means to allow said first liquid to flow from said second passage through said tubular plug, around said resilient seal on said second end of said valve member, through said transverse bores into said longitudinal bore and then into said second tubular means.

7. A device as defined in claim 1 in combination with a second of said devices of the same structure to permit the concurrent filtration of a number of said second liquids that is greater than possible with said first device, said first device having said first and second plug means removed therefrom and disposed in engagement with said first and second passages on said first end of said manifold block of said second device, and in addition:

g. a first tubular connector that sealingly connects said first passage at said first end of said manifold block of said first device to the second end of the first passage at the first end of the manifold block of said second device; and h. a second tubular connector that sealingly connects said second passage at said first end of said manifold block of said first device to the second end of the second passage at the first end of the manifold block of said second device.

8. First and second devices as defined in claim 7 in which said first tubular connector includes resilient means that slidably and sealingly engage said first passages in said first and second manifold blocks.

9. First and second devices as defined in claim 7 in which said second tubular connector includes threaded means that sealingly engage tapped end portions of said second passages in said first and second manifold blocks.

10. A device as defined in claim 1 which in addition includes:

g. a quick-release fitting connected to said length of pliable tubing, said quick-release fitting sealingly and removably engaging said second opening.

11. A device as defined in claim 10 in which said second opening has an intermediate circular lip therein and said quick release fitting including:

h. an intermediate ring-shaped member that has first and second tubular members projecting from opposite sides thereof, said first tubular member formed with longitudinally spaced barb on the exterior surface thereof that frictionally and sealingly engage an interior surface end portion of said length of resilient tubing, and said second tubular member capable of being extended downwardly through said second opening; and i. a resilient O-ring mounted in a circumferential groove on the exterior surface of said intermediate member, said O-ring frictionally and sealingly engaging said second opening when said intermediate ring-shaped member abuts against said lip.

* * * * *